(12) United States Patent
Fan

(10) Patent No.: US 9,416,914 B1
(45) Date of Patent: Aug. 16, 2016

(54) STRUCTURE FOR CRADLE HEAD

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 14/617,189

(22) Filed: Feb. 9, 2015

(51) Int. Cl.
*A47G 1/10* (2006.01)
*F16M 11/10* (2006.01)
*F16M 11/16* (2006.01)
*F16B 2/12* (2006.01)
*F16M 11/24* (2006.01)
*G03B 17/56* (2006.01)

(52) U.S. Cl.
CPC .............. *F16M 11/105* (2013.01); *F16B 2/12* (2013.01); *F16M 11/16* (2013.01); *F16M 11/242* (2013.01); *G03B 17/561* (2013.01)

(58) Field of Classification Search
CPC ... F16M 11/242; F16M 11/105; F16M 11/16; F16B 2/12; G03B 17/561
USPC .............. 248/165, 170, 188.7, 285.1, 286.1, 248/278.1, 298.1, 441.1, 918, 919, 316.1
See application file for complete search history.

(56) References Cited

U.S. PATENT DOCUMENTS

| 5,332,136 A * | 7/1994 | Rudolph | F16M 13/04 224/185 |
| 6,834,839 B1* | 12/2004 | Wilson | F16M 11/20 248/230.1 |
| 2009/0152413 A1* | 6/2009 | Takegawa | G10D 13/026 248/170 |
| 2013/0270850 A1* | 10/2013 | Fan | A45F 5/00 294/137 |
| 2014/0306081 A1* | 10/2014 | Fan | H04B 1/3888 248/274.1 |
| 2015/0274081 A1* | 10/2015 | Fan | B60R 11/02 224/570 |
| 2015/0362122 A1* | 12/2015 | Brown | F16M 11/041 348/208.2 |

* cited by examiner

*Primary Examiner* — Gwendolyn Baxter
(74) *Attorney, Agent, or Firm* — Rabin & Berdo, P.C.

(57) ABSTRACT

A cradle head is provided, applicable to a tripod, including a fixing base, a clamping device and a position adjustment assembly; wherein the fixing base engaged to the tripod; the clamping device being for clamping a portable electronic device; the position adjustment assembly including a carrier element and a sliding element; both the clamping device and the sliding element being installed on the carrier element and located on same side of carrier element; the sliding element able to slide along the carrier element without disengaging from carrier element; the sliding element partially extending from the carrier element to couple with fixing base; the clamping device installed at the carrier element in a rotatable manner; the sliding element adjustable with respect to the fixing base so that the center of mass of portable electronic device falling within a range covered by fixing base when clamped by the clamping device.

10 Claims, 7 Drawing Sheets

STRUCTURE FOR CRADLE HEAD

TECHNICAL FIELD

The technical field generally relates to a cradle head, and in particular, to a cradle head suitable for tripod with a smaller standing area to improve stability regardless whether a smart phone installed horizontally or vertically at the cradle head for operation.

BACKGROUND

As the pixel number and resolutions increase for the smart phone, more users vigorously use smart phones as a recording to document daily lives, including numerous selfie pictures or video clips. In addition, a retractable selfie auxiliary pole is often used for better result of selfie pictures. However, the known retractable selfie auxiliary pole is not designed to stand on the ground or other surfaces for distant photo-shooting.

To meet the demands for taking close-range selfie and long-range selfie pictures, a multi-functional selfie-tripod is developed. In a folded state, the selfie-tripod has a shape of a retractable pole for the user to hold in hand for close-range selfie. In an expanded state, the selfie-tripod with a plurality of legs extended outwards to form a tripod to stand alone for attaching a smart phone for long-range photo-shooting. However, as the bottom area covered by the extended legs of the selfie-tripod is often small, the stability of the selfie-tripod may be compromised when the smart phone is attached to the selfie-tripod in a vertical position. An enhanced structure for cradle head to improve stability is desirable.

SUMMARY

A primary object of the present disclosure is to provide a structure for cradle head, applicable to tripod with a smaller standing bottom area, such as, multi-functional selfie-tripod, so as to improve the stability of the tripod after adjustment when a portable electronic device is attached either vertically or horizontally.

To achieve the aforementioned object, the present disclosure provides a structure for cradle head, including a fixing base, a clamping device and a position adjustment assembly; wherein the fixing base being engaged to a tripod; the clamping device being for clamping a portable electronic device; the position adjustment assembly including a carrier element and a sliding element; both the clamping device and the sliding element being installed on the carrier element and located on a same side of the carrier element; the sliding element able to slide along the carrier element in a linear manner without disengaging from the carrier element; the sliding element being partially extending from the carrier element to couple with the fixing base; the clamping device being installed at the carrier element in a rotatable manner; the sliding element being adjustable with respect to the fixing base so that the center of mass of a portable electronic device falling within a range covered by the fixing base when the portable electronic device clamped by the clamping device.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
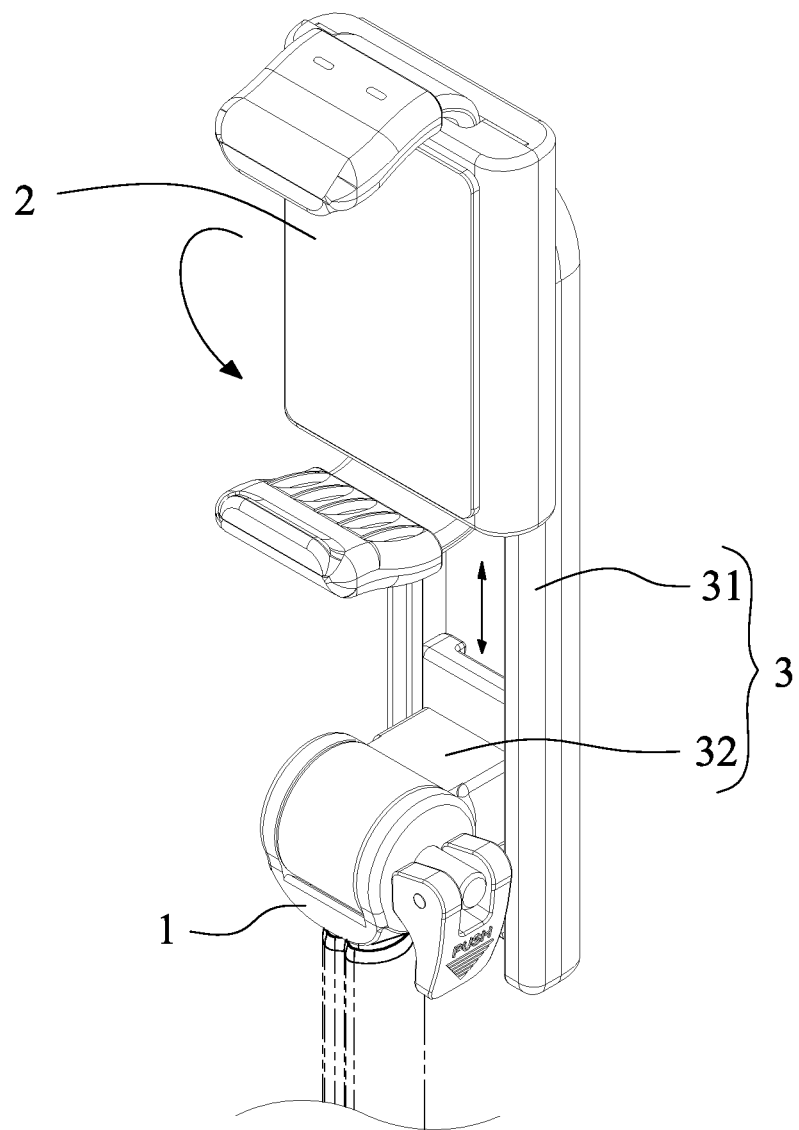
FIG. 1 shows a schematic view of a first exemplary embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
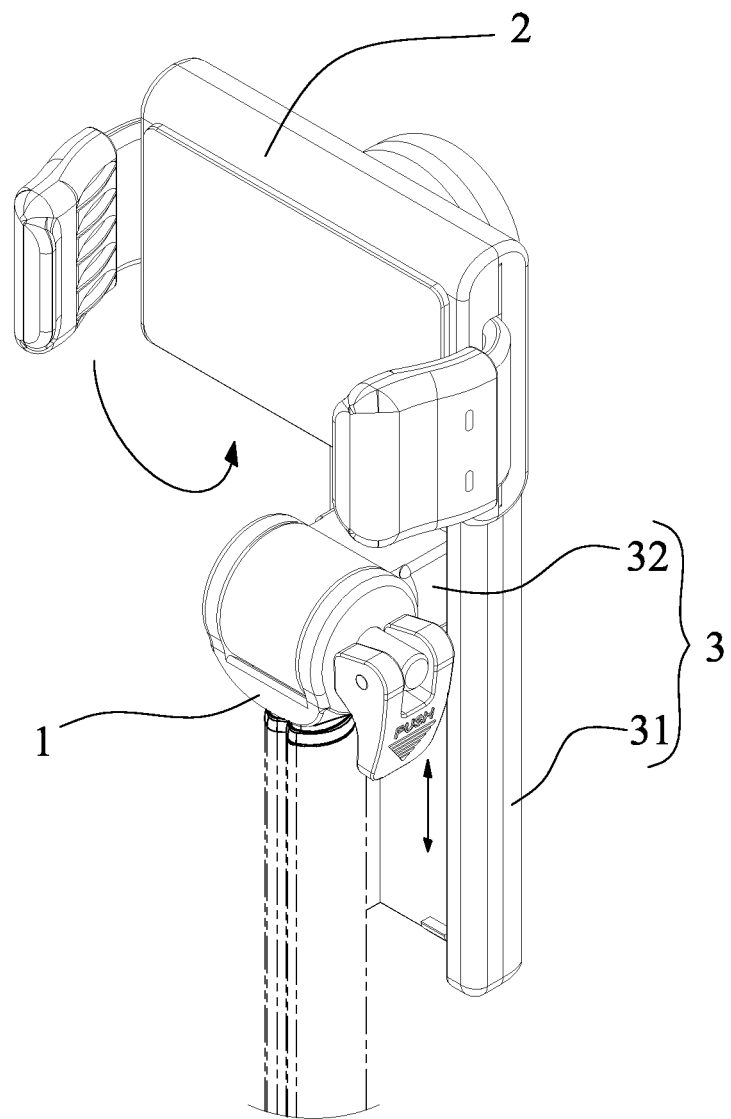
FIG. 2 shows another schematic view of the first exemplary embodiment of the present disclosure.

FIG. 1 and FIG. 2 show different schematic views of the first embodiment of the present disclosure. As shown in FIG. 1 and FIG. 2, a structure for the cradle head includes a fixing base 1, a clamping device 2, and a position adjustment assembly 3. The fixing base 1 is for being engaged to a tripod. The dash line in FIG. 1 and FIG. 2 indicates a support rod of the tripod. The clamping device 2 is for clamping a portable electronic device. Various clamping devices are available, and the present disclosure is not restricted to any specific clamping device. The position adjustment assembly 3 further includes a carrier element 31 and a sliding element 32. Both the clamping device 2 and the sliding element 32 are installed on the carrier element 31 and located on a same side but different part of the carrier element 31. The sliding element 32 is only able to slide in a linear manner, and the clamping device 2 is only able to rotate. The sliding element 32 is coupled with the fixing base 1. As such, whether the portable electronic device is clamped by the clamping device 2 in a vertical or horizontal position, the user can adjust the angle of the sliding element 32 with respect to the fixing base 1 or the position of the sliding element 32 on the carrier element 31 so that the center of the mass of the portable electronic device falls within a range covered by the fixing base 1. Hence, when the cradle head is applied to a multi-functional selfie-tripod, the selfie-tripod will not be easily tipped over.

Figure 3:
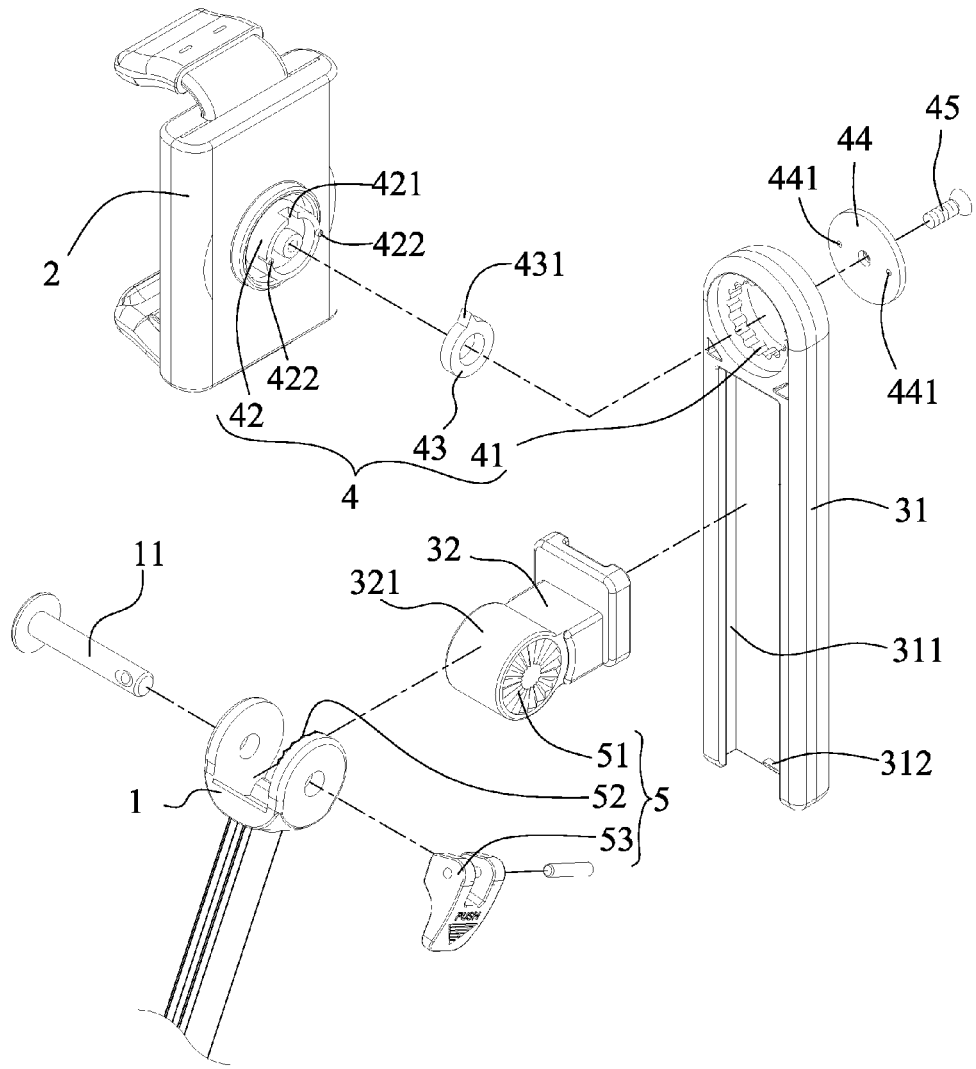
FIG. 3 shows an exploded view of the first embodiment of the present disclosure.

Refer to FIG. 3. As shown in FIG. 3, the carrier element 31 has a shape similar to a rectangle. The carrier element 31 includes a track 311, having a bottom width wider than the width of track opening. The sliding element 32 is partially shaped as a T-shape, matching the shape of the track 311 so that the sliding element 32 can slide along the track 311 in a linear manner. A stop block 312 is disposed close to an exit end of the track 311. The stop block 312 is to prevent the sliding element 32 from disengaging from the track 311. A segment of the carrier element 31 without the track 311 is disposed with the clamping device 2. The clamping device 2 rotates around a line perpendicular to the sliding direction of the sliding element 32.

The clamping device 2 is installed at the carrier element 31 in a rotatable manner, and is able to fix the position after the external force applied to rotate the clamping device 2 disappears. To achieve the object, a rotational mechanism 4 is used, including an inner hole tooth 41, an axial tube wall 42, and a resilient protruding tooth 43. The inner hole tooth 41 is formed at the carrier element 31. The axial tube wall 42 is located at the back of the clamping device 2, with a gap 421 in the axial tube wall 42. The resilient protruding tooth 43 has a ring shape, and is able to deformation along the radial direction by pressing and restoring to original shape after the pressure disappears. The circumference of the resilient protruding tooth 43 includes a stuck tooth 431 protruding along the radial direction. When assembled, the resilient protruding tooth 43 is located inside the axial tube wall 42, with the stuck tooth 431 extending through the gap 421 to the outside of the axial tube wall 42. The axial tube wall 42 is installed inside the inner hole tooth 41, and the stuck tooth 431 contacts with the inner hole tooth 41. In addition, to restrict the clamping device 2 from disengaging from the carrier element 31, the rotational mechanism 4 further includes a cover plate 44 and a screw bolt 45. The cover plate 44 includes a plurality of positioning trenches 441, and a plurality of positioning pillars 422 is formed radially protruding at the corresponding locations of the axial tube wall 42. The cover plate 44 has a diameter larger than the inner diameter of the inner hole tooth 41. To assemble, the cover plate 44 and the clamping device 2 are located on opposite sides of the carrier element 31; the cover plate 44 is assembled to the end side of the axial tube wall 42; the positioning pillars 422 are inserted into the positioning trenches 441; and the screw bolt 45 penetrates the cover plate 44 to engage to the center area of the axial tube wall 42. As such, the clamping device 2 is rotatable without disengaging from the carrier element 31.

The sliding element 32 is able to slide linearly along the carrier element 31; in addition, the sliding element 32 extends partially from the carrier element 31 to couple with the fixing base 1. The fixing base 1 has a shape of a three-dimensional U. The sliding element 32 further includes a coupling tube 321. When the coupling tube 321 is installed to the fixing base 1, an axial element 11 is used to penetrate the fixing base 1 and the coupling tube 321 so that the sliding element 32 is coupled to the fixing base 1. To fix the angle of the sliding element with respect to the fixing base after rotation, the coupling location is disposed with a lock assembly 5, including a first tooth surface 51, a second tooth surface 52 and a lock flip element 53; wherein the first tooth surface 51 is formed on at least an end surface of the coupling tube 321, and the second tooth surface 52 is formed on an inner side wall of the fixing base 1. The lock flip element 53 is coupled to one end of the axial element 11, and contacts with the outer wall of the fixing base 1. When the lock flip element 53 is flipped to a lock state, the first tooth surface 51 contacts with the second tooth surface 52 so as to fix the angle of the sliding element 32 with respect to the fixing base 1. On the other hand, when in an unlock state, the angle between the sliding element 32 and the fixing base 1 is adjustable.

Figure 4:
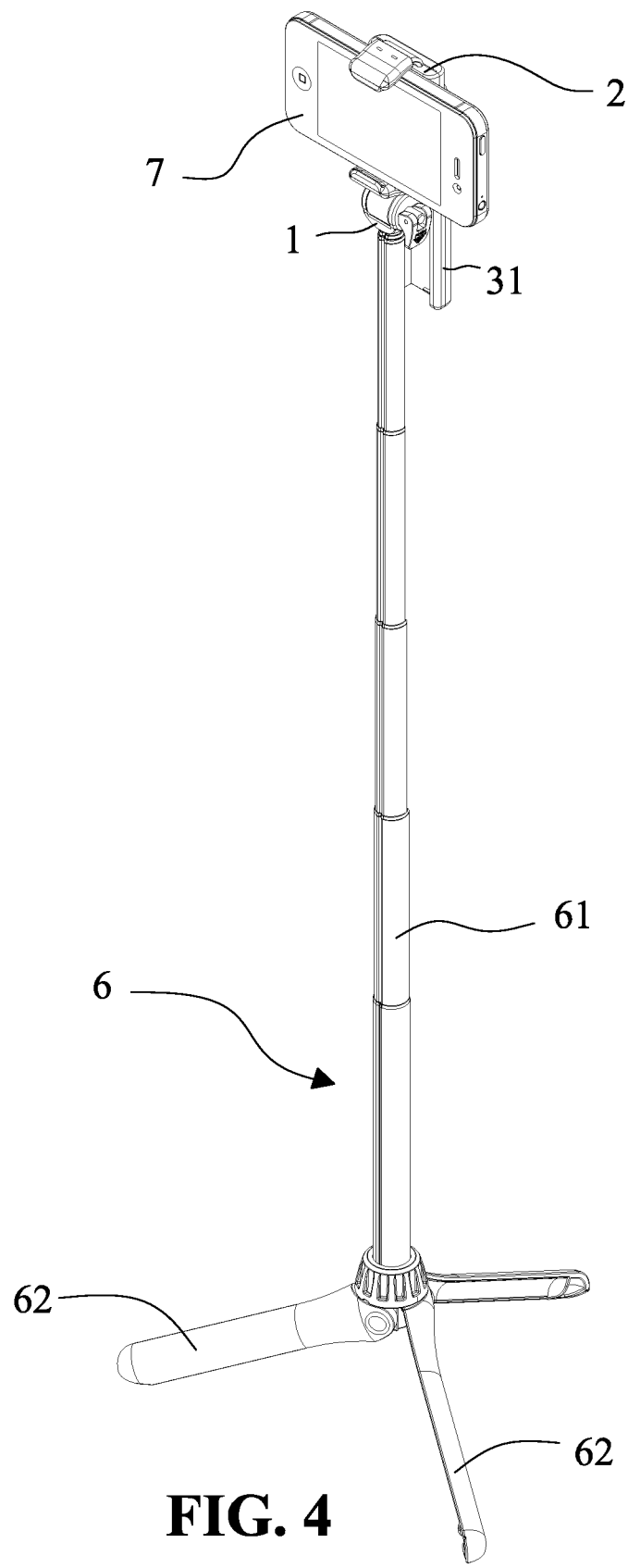
FIG. 4 shows a schematic view of the first embodiment applied to a multi-functional selfie-tripod in actual application.
Figure 5:
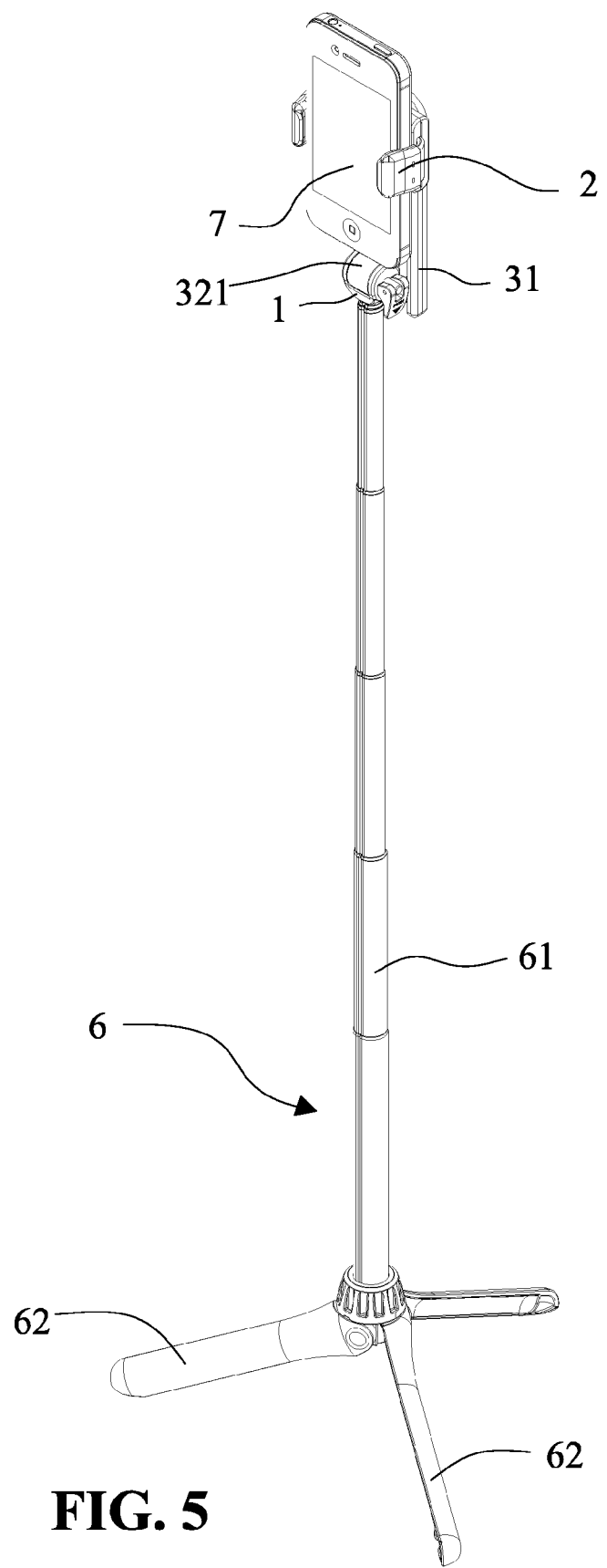
FIG. 5 shows another schematic view of the first embodiment applied to a multi-functional selfie-tripod in actual application.

FIG. 4 and FIG. 5 show schematic views of the cradle head installed to a multi-functional selfie-tripod. The cradle head of the present disclosure is fixed to a support pole 61 of a tripod 6, with the fixing base 1 engaged to the tip of the retractable support pole 61. The clamping device 2 clamps a smart phone 7. As shown in FIG. 4, when the smart phone 7 is clamped by the clamping device 2 in a horizontal position, the sliding element 32 is able to slide upwards to be close to the clamping device 2; then, the angle between the sliding element 32 and the fixing base 1 is adjusted so that the carrier element 31 stays in a vertical position to make the center of mass of the smart phone 7 fall within the range covered by the fixing base 1, preferably within the range of support pole 61. As such, even the standing bottom area of the tripod 6 with legs 62 expanded is small, the smart phone 7 is still supported stably. As shown in FIG. 5, when the smart phone 7 is clamped in a vertical position, the sliding element 32 slides downwards along the carrier element 31. Also, the clamping device 2 is rotated so that the lower edge of the smart phone 7 contacts with the fixing base 1 or the coupling tube 321. In this state, the center of the mass of the smart phone still falls within the range covered by the fixing base 1. As such, whether the smart phone 7 is in a vertical or horizontal position, the cradle head of the present disclosure can be used with a tripod to provide stable support.

Figure 6:
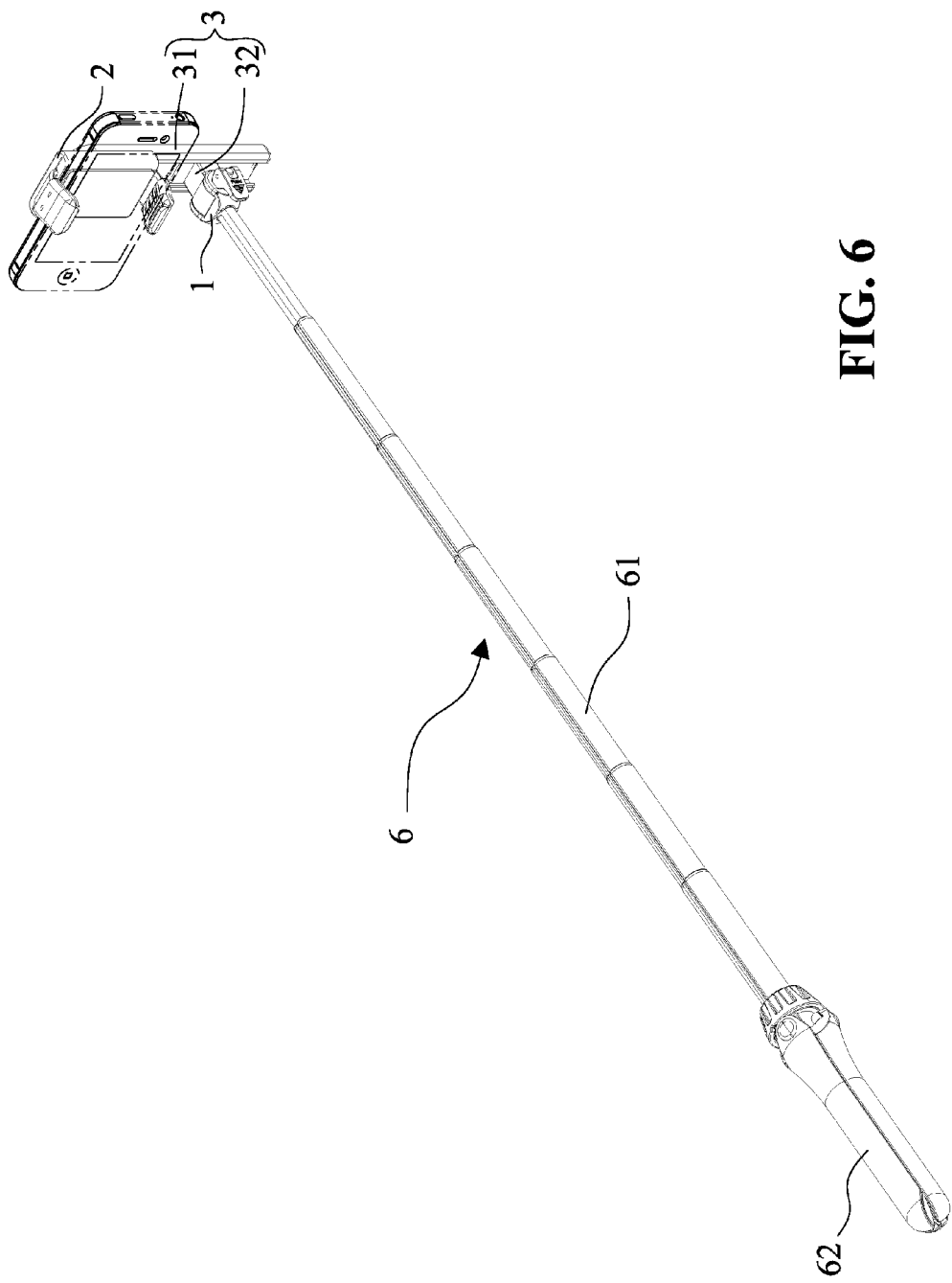
FIG. 6 shows yet another schematic view of the first embodiment applied to a multi-functional selfie-tripod in actual application.

FIG. 6 shows a schematic view of the tripod 6 for taking selfie. For a selfie, the angle between the sliding element 32 and the fixing base 1 must be adjusted, with the legs 62 of the tripod 6 folded into a column for holding in hand.

Figure 7:
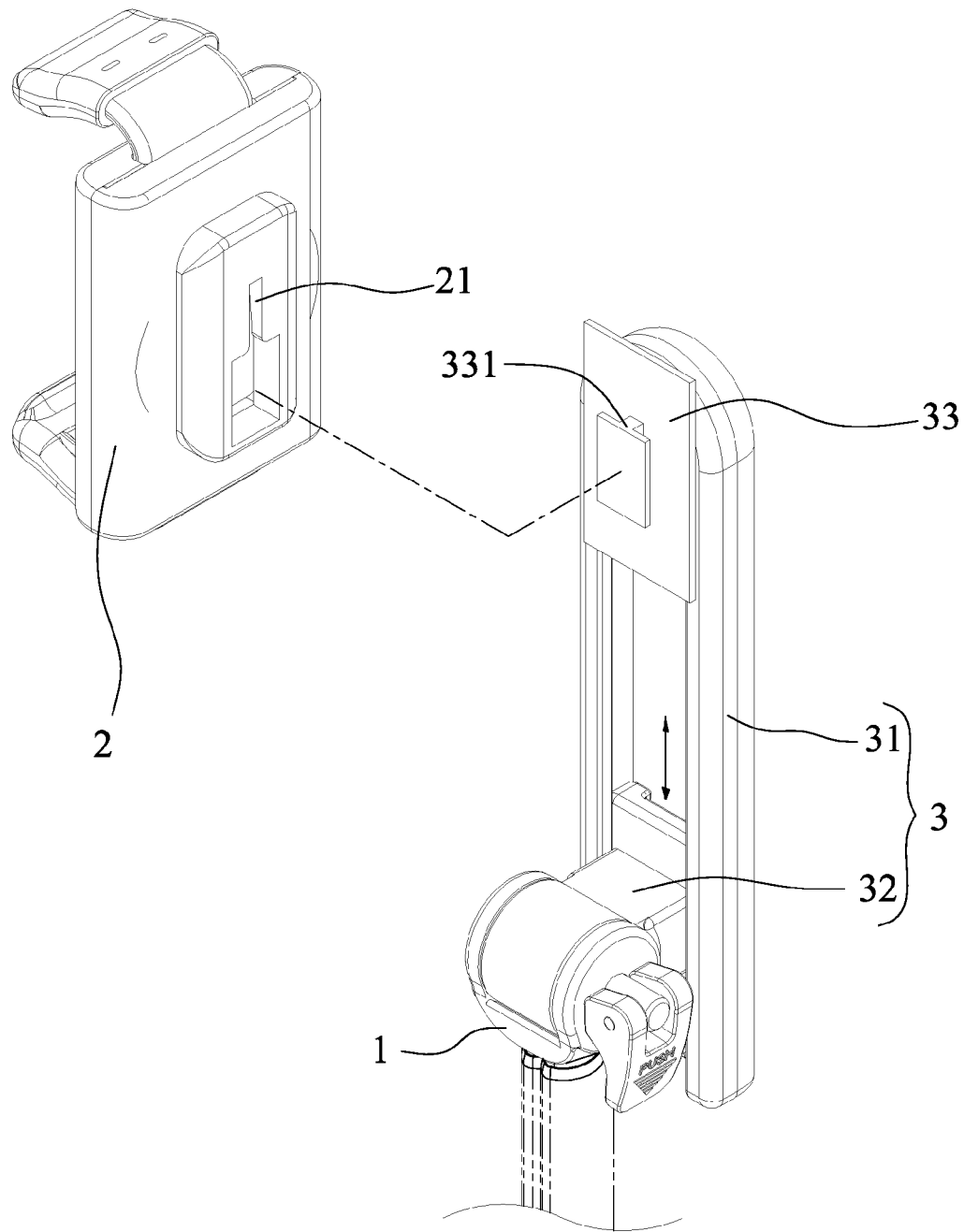
FIG. 7 shows a schematic view of a second exemplary embodiment of the present disclosure.

In the above embodiment, the clamping device 2 is installed to the carrier element 31. FIG. 7 shows a second embodiment, including a fixing base 1, a clamping device 2 and a position adjustment assembly 3. However, this the second embodiment, the position adjustment assembly 3 further includes a rotation element 33, in addition to the carrier element 31 and sliding element 32. The fixing base 1, sliding element 32 and carrier element 31 are the same as in the first embodiment. The rotation element 33 is installed at the carrier element 31 in a rotatable manner. The installation location and the structure are similar to the rotational mechanism 4 in the first embodiment, except that the rotation element 33 includes an exposed buckle element 331, located on the same side as the sliding element 32. A stuck trench 21 is disposed on the back of the clamping device 2, and the shape of the stuck trench 21 matches the shape of the buckle element 331. As such, the clamping device 2 is detachable from the carrier element 31.

In summary, the cradle head of the present disclosure allows adjustment a sliding element with respect to a fixing base to provide better stability when used for clamping a smart phone so that the center of mass of the smart phone remains falling within the range covered by the tripod to avoid tipping over.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A structure for a cradle head, comprising:
a fixing base for being engaged to a tripod;
a clamping device for clamping a portable electronic device; and
a position adjustment assembly including
a carrier element, the clamping device being installed at the carrier element in a rotatable manner, and
a sliding element installed on the carrier element, both the clamping device and the sliding element located on a same side of the carrier elemen, the sliding element being able to slide along the carrier element in a linear manner without disengaging from the carrier element, the sliding element being partially extended from the carrier element to couple with the fixing base, the sliding element being adjustable with respect to the fixing base so that the center of mass of the portable electronic device is positionable within a range covered by the fixing base when the portable electronic device is clamped by the clamping device.

2. The structure for the cradle head as claimed in claim 1, wherein
the carrier element has a rectangular shape, and a track, and the sliding element has a shape matching a shape of the track and is able to slide along the track in a linear manner.

3. The structure for the cradle head as claimed in claim 2, wherein the clamping device is installed at a part of the carrier element without the track, and rotates around a center line perpendicular to a sliding direction of the sliding element.

4. The structure for the cradle head as claimed in claim 3, further comprising a rotational mechanism disposed at a location where the clamping device is installed on the carrier element, the rotational mechanism comprising:
an inner hole tooth formed at the carrier element,
an axial tube wall located at a back of the clamping device, with a gap in the axial tube wall, and
a resilient protruding tooth having a ring shape, and is able to deform along the radial direction of the ring shape by pressing with pressure, and also restoring to an original shape of the resilient protruding tooth after the pressure disappears, the resilient protruding tooth includes a stuck tooth at the circumference of the ring shape of the resilient protruding tooth and protruding along the radial direction,
wherein when assembled, the resilient protruding tooth is located inside the axial tube wall, with the stuck tooth extending through the gap to an outside of the axial tube wall, the axial tube wall is installed inside the inner hole tooth, and the stuck tooth contacts the inner hole tooth.

5. The structure for the cradle head as claimed in claim 3, further comprising a rotational mechanism disposed at a location of the carrier element where no track is placed, the clamping device being installed to the carrier element by the rotational mechanism.

6. The structure for the cradle head as claimed in claim 1, wherein a lock assembly is disposed at a location where the sliding element is coupled to the fixing base, and when the lock assembly is in a lock state, the lock assembly is able to fix an angle of the sliding element with respect to the fixing base.

7. The structure for the cradle head as claimed in claim 1, wherein the clamping device is installed at the carrier element in a rotatable manner, but is unable to disengage from the carrier element.

8. The structure for the cradle head as claimed in claim 1, wherein the clamping device is detachably installed at the carrier element.

9. The structure for the cradle head as claimed in claim 8, wherein the position adjustment assembly further comprises a rotation element, installed in a rotatable manner at a part of the carrier element without a track, the rotation element comprises an exposed buckle element, located on a same side as the sliding element,
wherein a stuck trench is disposed on a back of the clamping device, and a shape of the stuck trench matches a shape of the buckle element, and
wherein the buckle element is inserted into the stuck trench so that the clamping device is detachably installed to the carrier element.

10. The structure for the cradle head as claimed in claim 1, further comprising a rotational mechanism disposed at a location of the carrier element where no track is placed, the clamping device being installed to the carrier element by the rotational mechanism.

\* \* \* \* \*